(No Model.)
J. DAVIS.
WATER PURIFIER.
No. 402,660. Patented May 7, 1889.
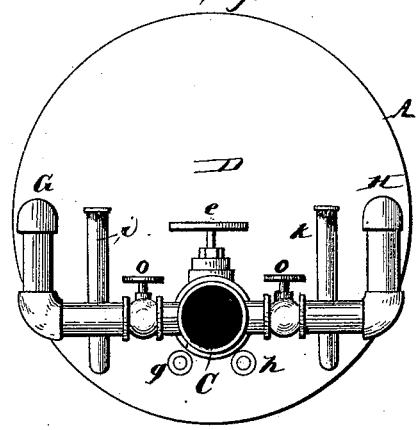
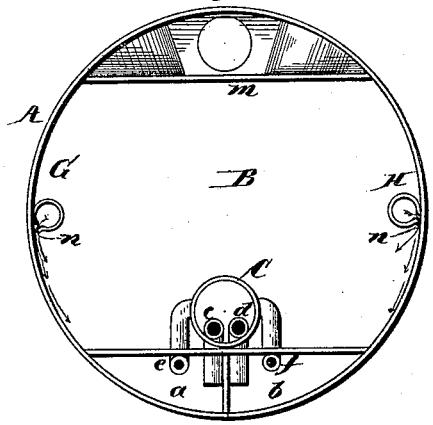
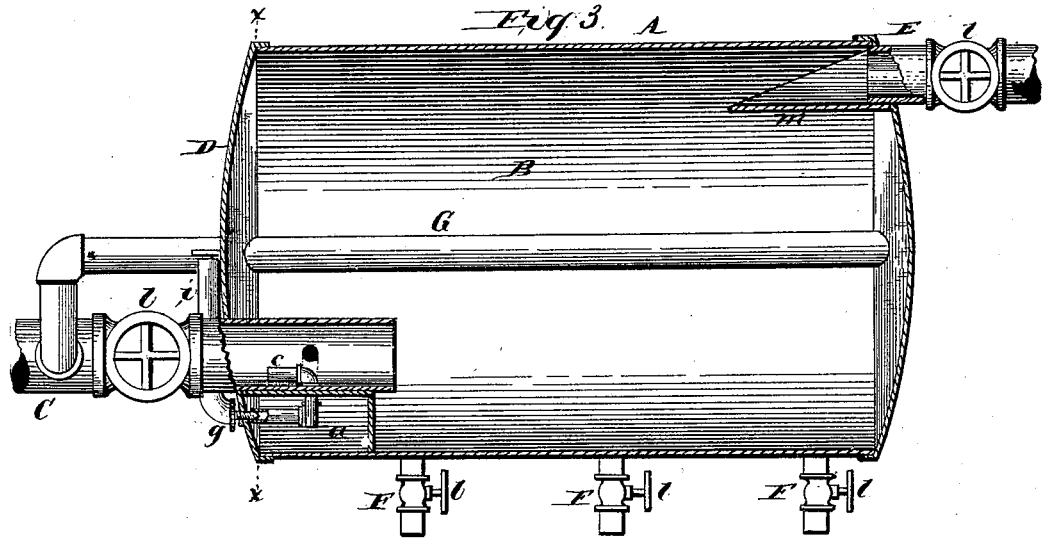
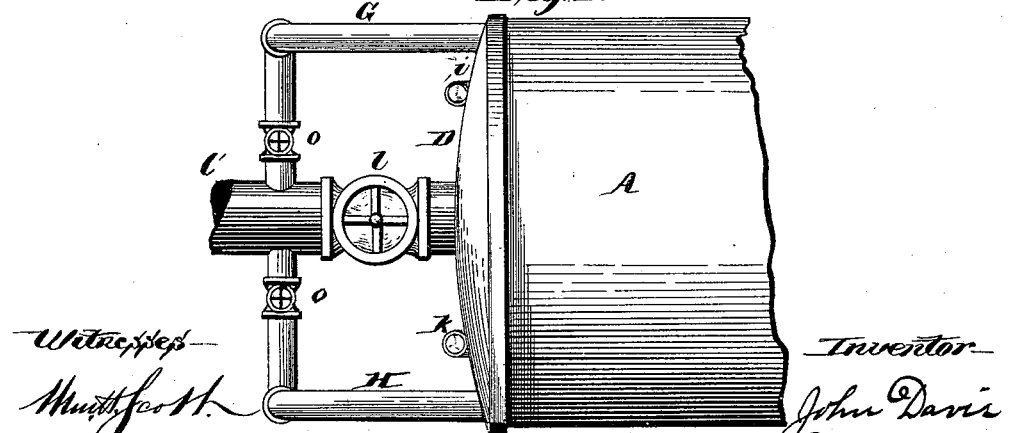
Witnesses—
Inventor—
John Davis
By Johnston, Reinohl & Dyer
Attorneys

UNITED STATES PATENT OFFICE.

JOHN DAVIS, OF ALLEGHENY, PENNSYLVANIA.

WATER-PURIFIER.

SPECIFICATION forming part of Letters Patent No. 402,660, dated May 7, 1889.

Application filed November 20, 1888. Serial No. 291,377. (No model.)

*To all whom it may concern:*

Be it known that I, JOHN DAVIS, a citizen of the United States, residing at Allegheny, in the county of Allegheny and State of Pennsylvania, have invented certain new and useful Improvements in Water-Purifiers; and I do hereby declare the following to be a full, clear, and exact description of the invention, such as will enable others skilled in the art to which it appertains to make and use the same.

My invention relates to the art of purifying water for household and other purposes, and has for its object an improved construction of a device for neutralizing and collecting impurities contained in the water by coagulation and precipitation.

The invention will be hereinafter described, and particularly pointed out in the claims.

In the accompanying drawings, which form part of this specification, Figure 1 represents a front end view; Fig. 2, a similar view on the line $x\ x$ of Fig. 3; Fig. 3, a vertical longitudinal section, and Fig. 4 a plan of the front end with the body broken.

Reference being had to the drawings and the letters thereon, A indicates an elongated vessel which may be in the form of a cylinder, as shown, or of any other desired form, and may be used in a horizontal position, as shown; or it may be used vertically by slight modifications in the construction—such as changing the position of sediment-discharge pipes and the pipes through which the chemicals are put into the chemical-chamber. The preferred position is, however, that shown. Within the vessel A is a coagulating and precipitating chamber, B, which is provided with a supply-pipe, C, and chambers $a\ b$, for containing suitable chemicals—such as alum or or other coagulating agent—for mingling with the water supplied to the chamber B to produce coagulation and precipitation of the animalculæ and other impurities.

With the supply-pipe C are connected pipes $c\ d$, which are turned so that their open ends are in the direction of the incoming water in said pipe, and communicate, respectively, with the chemical-chambers $a\ b$, for supplying water thereto, and pipes $e\ f$, controlled by suitable valves, $g\ h$, for regulating the quantity of the chemical solution supplied to the water flowing into the coagulating and precipitating chamber B, communicate with the chambers $a\ b$ and the pipe C.

The chemicals are supplied to the chambers $a\ b$ through pipes $i\ k$, which project through the end D of the vessel and are provided with suitable caps or covers for closing them. Instead of using two chemical-chambers and different kinds of coagulating agents, one chamber and one kind only may be used.

E indicates a discharge-pipe for purifying water, and F a series of pipes for discharging sediment, all of which and the supply-pipe C are provided with suitable stop-cocks, $l$; and to prevent the escape of sediment with the purified water a diaphragm, $m$, crosses the chamber B and extends into said chamber a suitable distance.

G H indicate pipes extending along the inside of the vessel on each side and about the median line, and are provided with a narrow slot, $n$, to discharge water in a thin sheet against the walls of the chamber B, for the purpose of washing off the sediment while the coagulating-chamber is being cleaned. These pipes G H also extend through the front end of the vessel A, communicate with the supply-pipe C, and are provided with stop-cocks $o$, for controlling the supply of water for cleansing the chamber B.

In the practical application of my purifier it may be used in connection with one or a system of filters for supplying water in large quantities for any purpose, and the water may be aerated by any suitable means, or the water may be used directly from the purifier for many purposes. In its application to a battery of filters it must be made large enough to accommodate all the water supplied to them, and its use therewith will dispense with the necessity of providing sediment-chambers in the filters.

The vessel A is provided with one or more man-holes (not shown) to afford ingress to the chamber B.

I am aware that it has been proposed to impregnate water with lime in one vessel and then conduct it into another separate vessel containing filtering-bodies, through which the water is compelled to pass, and therefore do not claim a filtering device.

Having thus fully described my invention, what I claim is—

1. A water-purifier consisting of an unobstructed coagulating and precipitating chamber, a chemical-chamber contained within the former chamber, and a supply-pipe communicating with both of said chambers, in combination with a pipe communicating with the upper part of the precipitating-chamber for discharging purified water, substantially as described.

2. A water-purifier consisting of an unobstructed coagulating and precipitating chamber, a chemical-chamber within and at one end thereof, a supply-pipe connected with the chemical-chamber by supply and discharge pipes, and a valve for controlling the supply of chemicals, in combination with a pipe communicating with the upper part of the precipitating-chamber for discharging purified water, and a sediment-discharge pipe, substantially as described.

3. A water-purifier consisting of a coagulating and precipitating chamber, a chemicalchamber, a main supply-pipe communicating with the chemical-chamber by means of a pipe within the main supply, and the receiving end of which is bent forward in the direction of the incoming water, and a pipe for conducting the water impregnated with chemicals into the main supply-pipe, in combination with a pipe communicating with the upper part of the precipitating-chamber for discharging purified water, substantially as described.

4. A water-purifier having a coagulating and precipitating chamber, and a main supply-pipe provided with a valve, in combination with pipes passing through one end of the vessel, communicating with the main between its source of supply and the valve, extending along the inner sides of the vessel, having elongated openings adjacent to the sides of the vessel for discharging water in thin sheets, and provided with valves for controlling the supply of water from the main, substantially as described.

In testimony whereof I affix my signature in presence of two witnesses.

JOHN DAVIS.

Witnesses:
S. A. TERRY,
WM. E. DYRE.